US011153540B2

United States Patent
Suzuki

(10) Patent No.: US 11,153,540 B2
(45) Date of Patent: Oct. 19, 2021

(54) MULTI-PROJECTION SYSTEM, PROJECTOR, AND METHOD OF CONTROLLING PROJECTOR

(71) Applicant: SEIKO EPSON CORPORATION, Tokyo (JP)

(72) Inventor: Naoki Suzuki, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/660,977

(22) Filed: Oct. 23, 2019

(65) Prior Publication Data

US 2020/0137364 A1 Apr. 30, 2020

(30) Foreign Application Priority Data

Oct. 24, 2018 (JP) .............................. JP2018-199804

(51) Int. Cl.
*H04N 9/31* (2006.01)
*H04N 21/47* (2011.01)
*H04N 21/422* (2011.01)

(52) U.S. Cl.
CPC ......... *H04N 9/3147* (2013.01); *H04N 9/3182* (2013.01); *H04N 21/42204* (2013.01); *H04N 21/47* (2013.01); *H04N 21/42208* (2013.01)

(58) Field of Classification Search
CPC .... H04N 9/3147; H04N 9/3185; H04N 9/317; H04N 9/3179; H04N 9/3194; H04N 9/3155; H04N 9/3182; H04N 13/204; H04N 19/119; H04N 19/12; H04N 19/563; H04N 19/593; H04N 19/597; H04N 19/61; H04N 21/41407; H04N 21/4147; H04N 21/4334; H04N 21/47; H04N 21/854; H04N 5/04; H04N 5/22541; H04N 5/23206; H04N 5/23238; H04N 5/23248; H04N 5/23267; H04N 5/445; H04N 5/74; H04N 9/31; H04N 9/3105; H04N 9/3111;
(Continued)

(56) References Cited

U.S. PATENT DOCUMENTS

2002/0159035 A1\* 10/2002 Koyama .............. H04N 9/3147
353/31
2016/0139869 A1 5/2016 Ito
2019/0037181 A1 1/2019 Suzuki

FOREIGN PATENT DOCUMENTS

JP 2001-272723 A 10/2001
JP 2016-024296 A 2/2016
(Continued)

*Primary Examiner* — Samira Monshi
(74) *Attorney, Agent, or Firm* — Dority & Manning, P.A.

(57) ABSTRACT

A multi-projection system includes a plurality of projectors and combines projection images of the plurality of projectors with each other to thereby display an image including an item selection image used to select an item to be adjusted from a plurality of adjustment items on a projection surface, a first projector as one of the plurality of projectors including a receiving section configured to receive an instruction related to an adjustment of the multi-projection system, and a condition control section configured to make a condition of the adjustment item in the item selection image different between a first case where the instruction represents a first adjustment of adjusting the plurality of projectors in a lump and a second case where the instruction represents a second adjustment of individually adjusting the plurality of projectors.

12 Claims, 11 Drawing Sheets

(58) Field of Classification Search
CPC .. H04N 9/3114; H04N 9/3135; H04N 9/3138; H04N 9/3158; H04N 9/3161; H04N 9/3197
See application file for complete search history.

(56) References Cited

FOREIGN PATENT DOCUMENTS

| | | |
|---|---|---|
| JP | 2016-095417 A | 5/2016 |
| JP | 2019-023711 A | 2/2019 |
| JP | 2019-024180 A | 2/2019 |

\* cited by examiner

MULTI-PROJECTION SYSTEM, PROJECTOR, AND METHOD OF CONTROLLING PROJECTOR

The present application is based on, and claims priority from JP Application Serial Number 2018-199804, filed Oct. 24, 2018, the disclosure of which is hereby incorporated by reference herein in its entirety.

BACKGROUND

1. Technical Field

The present disclosure relates to a multi-projection system, a projector, and a method of controlling a projector.

2. Related Art

In JP-A-2016-95417, there is described a multi-projection system for combining images to respectively be projected by a plurality of projectors with each other to thereby generate a combined image. The multi-projection system is capable of displaying an OSD (on-screen display) image used for, for example, an adjustment of the multi-projection system on the combined image.

As the adjustment of the multi-projection system, there can be cited an overall adjustment for adjusting the plurality of projectors in a lump, and an individual adjustment for individually adjusting the plurality of projectors. Here, when the condition of the image used for the adjustment of the multi-projection system such as the OSD image described above is not different between the overall adjustment and the individual adjustment, there is a possibility that the user cannot determine whether the image used for the adjustment is for the overall adjustment or for the individual adjustment.

SUMMARY

A multi-projection system according to an aspect of the present disclosure is a multi-projection system including a plurality of projectors and configured to combine projection images of the plurality of projectors with each other to thereby display an image including an item selection image used to select an item to be adjusted from a plurality of adjustment items on a projection surface, a first projector as one of the plurality of projectors including a receiving section configured to receive an instruction related to an adjustment of the multi-projection system, and a condition control section configured to make a condition of the adjustment item in the item selection image different between a first case where the instruction represents a first adjustment of adjusting the plurality of projectors in a lump and a second case where the instruction represents a second adjustment of individually adjusting the plurality of projectors.

A projector according to an aspect of the present disclosure is a projector belonging to a multi-projection system configured to combine projection images of a plurality of projectors with each other to thereby display an image including an item selection image used to select an item to be adjusted from a plurality of adjustment items on a projection surface, the projector including a receiving section configured to receive an instruction related to an adjustment of the multi-projection system in a situation where the projector belongs to the multi-projection system, and a condition control section configured to make a condition of the adjustment item in the item selection image different between a first case where the instruction represents a first adjustment of adjusting the plurality of projectors in a lump and a second case where the instruction represents a second adjustment of individually adjusting the plurality of projectors.

A method of controlling a projector according to an aspect of the present disclosure is a method of controlling a projector belonging to a multi-projection system configured to combine projection images of a plurality of projectors with each other to thereby display an image including an item selection image used to select an item to be adjusted from a plurality of adjustment items on a projection surface, the method including the steps of receiving an instruction related to an adjustment of the multi-projection system in a situation where the projector belongs to the multi-projection system, and making a condition of the adjustment item in the item selection image different between a first case where the instruction represents a first adjustment of adjusting the plurality of projectors in a lump and a second case where the instruction represents a second adjustment of individually adjusting the plurality of projectors.

DESCRIPTION OF AN EXEMPLARY EMBODIMENT

A: Embodiment

A1: General Configuration of Multi-projection System 1

Figure 1:
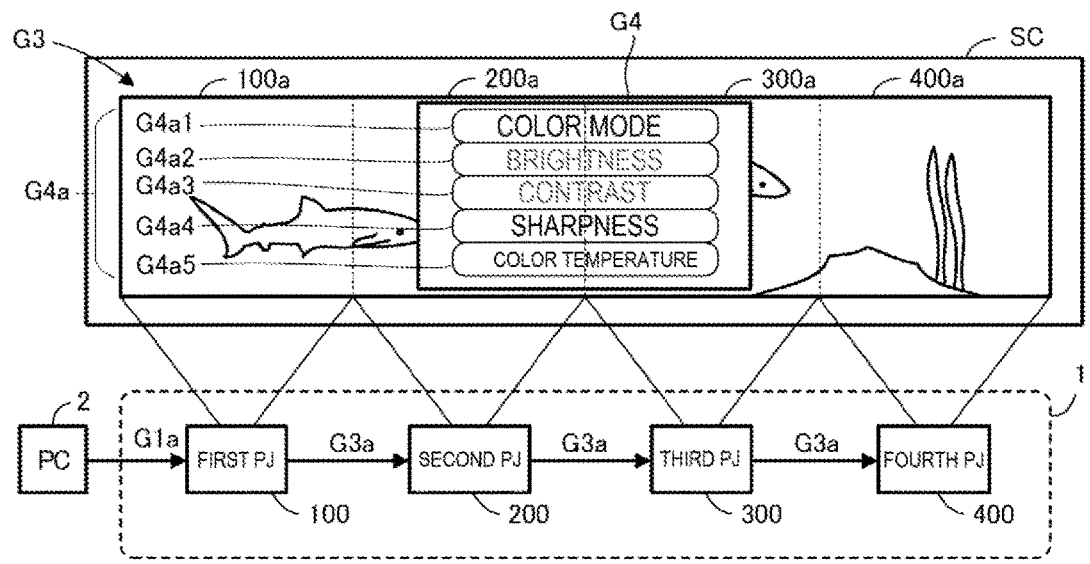
FIG. 1 is a diagram showing a multi-projection system 1 according to an embodiment.

FIG. 1 is a diagram showing a multi-projection system 1 according to an embodiment. In FIG. 1, the projector is denoted by "PJ."

The multi-projection system 1 includes a first projector 100, a second projector 200, a third projector 300, and a fourth projector 400. It should be noted that the number of projectors constituting the multi-projection system 1 is not limited to four, and is only required to be equal to or larger than two.

It is possible for each of the first projector 100, the second projector 200, the third projector 300, and the fourth projector 400 to belong to, or not to belong to the multi-projection system 1. When each of the first projector 100, the second projector 200, the third projector 300, and the fourth projector 400 does not belong to the multi-projection system 1, the projector can operate by itself.

The first projector 100, the second projector 200, the third projector 300, and the fourth projector 400 are daisy-chain connected to one another in this order. It should be noted that the connection configuration of the first projector 100, the second projector 200, the third projector 300, and the fourth projector 400 is not limited to the daisy-chain connection, but can arbitrarily be changed.

The multi-projection system 1 is capable of performing each of the overall adjustment and the individual adjustment.

In the overall adjustment, the first projector 100, the second projector 200, the third projector 300, and the fourth projector 400 are adjusted in a lump. The overall adjustment is an example of a first adjustment.

In the individual adjustment, the first projector 100, the second projector 200, the third projector 300, and the fourth projector 400 are individually adjusted. The individual adjustment is an example of a second adjustment.

The multi-projection system 1 combines a first projection image 100a projected by the first projector 100, a second projection image 200a projected by the second projector 200, a third projection image 300a projected by the third projector 300, and a fourth projection image 400a projected by the fourth projector 400 with each other on a projection surface SC to thereby display a composite image G3 on the projection surface SC. The composite image G3 is a tiling image formed by arranging a plurality of projection images on the projection surface SC. The projection surface SC is, for example, a screen or a wall.

The composite image G3 illustrated in FIG. 1 includes an item selection image G4 for selecting an adjustment item of the multi-projection system 1.

In the item selection image G4 illustrated in FIG. 1, there are included an item G4a1 of a color mode, an item G4a2 of brightness, an item G4a3 of contrast, an item G4a4 of sharpness, and an item G4a5 of color temperature as items G4a related to the adjustment. It should be noted that the items G4a are not limited to the item G4a1 of the color mode, the item G4a2 of the brightness, the item G4a3 of the contrast, the item G4a4 of the sharpness, and the item G4a5 of the color temperature, but can arbitrarily be changed.

In the individual adjustment, the multi-projection system 1 can use the item G4a1 of the color mode, the item G4a2 of the brightness, the item G4a3 of the contrast, the item G4a4 of the sharpness, and the item G4a5 of the color temperature. The multi-projection system 1 according to the present embodiment has a configuration capable of performing the individual adjustment with respect to the color mode, the brightness, the contrast, the sharpness, and the color temperature.

In contrast, in the overall adjustment, the multi-projection system 1 can use the item G4a1 of the color mode, the item G4a4 of the sharpness, and the item G4a5 of the color temperature, but cannot use the item G4a2 of the brightness and the item G4a3 of the contrast. The multi-projection system 1 according to the present embodiment has a configuration not capable of performing the overall adjustment with respect to the brightness and the contrast.

In other words, the item G4a1 of the color mode, the item G4a4 of the sharpness, and the item G4a5 of the color temperature can be used in both of the individual adjustment and the overall adjustment, but the item G4a2 of the brightness and the item G4a3 of the contrast can be used in the individual adjustment but cannot be used in the overall adjustment.

The first projector 100 functions as a master projector. Each of the second projector 200, the third projector 300, and the fourth projector 400 functions as a slave projector.

A2: Configuration Example of First Projector 100

Figure 2:
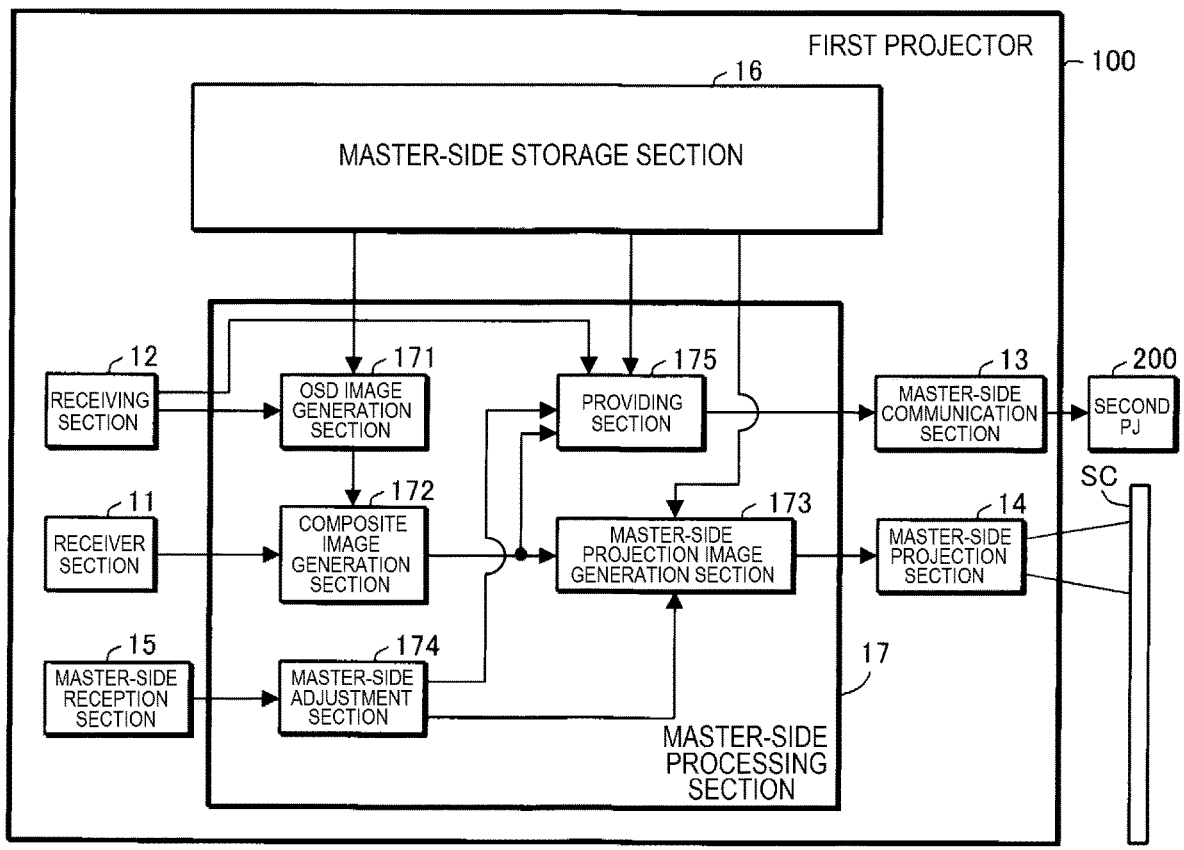
FIG. 2 is a diagram showing an example of a first projector 100.

FIG. 2 is a diagram showing an example of the first projector 100 which functions as the master projector. The first projector 100 includes a receiver section 11, a receiving section 12, a master-side communication section 13, a master-side projection section 14, a master-side reception section 15, a master-side storage section 16, and a master-side processing section 17.

Figure 3:
FIG. 3 is a diagram showing an example of a first image G1.

The receiver section 11 is, for example, an input terminal of image information. The receiver section 11 receives first image information G1a from a personal computer (PC) 2 shown in FIG. 1. The PC 2 is an example of an image supply device. The image supply device is also referred to generally as a source device in some cases. It should be noted that the image supply device is not limited to the PC 2. For example, it is also possible to use a DVD (digital versatile disc) player as the image supply device. An example of a first image G1 representing the first image information G1a is shown in FIG. 3. It should be noted that the first image G1 is not limited to the image illustrated in FIG. 3, but can arbitrarily be changed. The resolution of the first image G1 is, for example, 8 K horizontally and 1 K vertically. The resolution of the first image G1 is not limited to 8 K horizontally and 1 K vertically, but can arbitrarily be changed.

The receiving section 12 corresponds to, for example, operating buttons or a touch panel. The receiving section 12 can also be referred to as an operation receiving section. The receiving section 12 receives a variety of operation instructions from the user. When citing an example, the receiving section 12 receives an instruction related to the adjustment of the multi-projection system 1 from the user. Hereinafter, the "instruction related to the adjustment of the multi-projection system 1" will be referred to as an "adjustment instruction." The receiving section 12 is capable of receiving the adjustment instruction representing the overall adjustment, and is further capable of receiving the adjustment instruction representing the individual adjustment. Further, the receiving section 12 receives a selection instruction for selecting any of the items G4a shown in the item selection image G4 from the user.

The master-side communication section 13 communicates with the second projector 200. The master-side communication section 13 transmits, for example, composite image information G3a representing the composite image G3 to the second projector 200.

The master-side projection section 14 projects the first projection image 100a on the projection surface SC to thereby display the first projection image 100a based on first partial image information representing the first projection image 100a. Here, the first partial image information is generated by the master-side processing section 17 based on the composite image information G3a, and then, provided to the master-side projection section 14.

The master-side reception section 15 corresponds to, for example, operating buttons. The master-side reception section 15 receives an operation by the user. For example, the master-side reception section 15 receives a content instruction representing an adjustment content related to the item G4a selected by the user such as the item G4a4 of the sharpness. Here, the master-side reception section 15 can also be included in the receiving section 12. In this case, the receiving section 12 receives the content instruction as a result.

The master-side storage section 16 is a computer-readable recording medium. The master-side storage section 16 is, for example, a flash memory. The master-side storage section 16 is not limited to the flash memory, but can arbitrarily be changed. The master-side storage section 16 stores, for example, a variety of types of information and a program to be executed by the master-side processing section 17.

Figure 4:
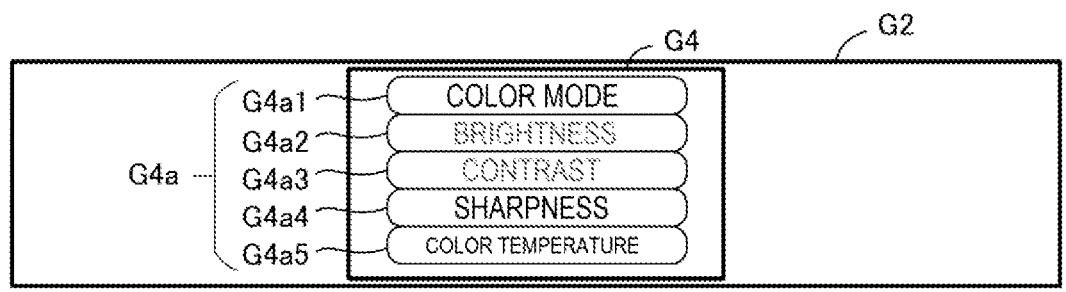
FIG. 4 is a diagram showing an example of an OSD image G2.

As an example of the variety of types of information stored by the master-side storage section 16, there can be cited information related to the OSD. For example, the information related to the OSD is used for generating an OSD image G2 including the item selection image G4. FIG. 4 shows an example of the OSD image G2. The resolution of the OSD image G2 is the same as the resolution of the first image G1. It should be noted that the OSD image G2 is not limited to the image illustrated in FIG. 4, but can arbitrarily be changed.

The master-side processing section 17 is a computer such as a central processing unit (CPU). The master-side processing section 17 can also be formed of one processor, or a plurality of processors. The master-side processing section 17 can also be provided with an electronic circuit such as an FPGA (field programmable gate array) or an ASIC (application specific IC) instead of, or in addition to the CPU.

The master-side processing section 17 retrieves and then performs the program stored in the master-side storage section 16 to thereby realize an OSD image generation section 171, a composite image generation section 172, a master-side projection image generation section 173, a master-side adjustment section 174, and a providing section 175.

The OSD image generation section 171 is an example of a condition control section. The OSD image generation section 171 generates OSD image information G2a representing the OSD image G2 using the information related to the OSD stored in the master-side storage section 16. The OSD image generation section 171 makes the condition of the items G4a included in the OSD image G2, specifically the item G4a2 of the brightness and the item G4a3 of the contrast different between a first case where the adjustment instruction represents the overall adjustment and a second case where the adjustment instruction represents the individual adjustment. The item G4a2 of the brightness and the item G4a3 of the contrast are each an example of the adjustment item.

The composite image generation section 172 generates the composite image information G3a using the first image information G1a and the OSD image information G2a.

The master-side projection image generation section 173 generates first partial image information by extracting the first partial image information from the composite image information G3a using first identification information representing a position of the first projection image 100a included in the composite image G3, specifically, a position of the first projection image 100a in the composite image G3. The first identification information is, for example, set by the user, and is stored in the master-side storage section 16. Further, the master-side projection image generation section 173 is capable of performing image processing on the first partial image information.

The master-side adjustment section 174 adjusts the settings of the first projector 100 based on the adjustment content represented by the content instruction received by the master-side reception section 15. For example, the master-side adjustment section 174 adjusts the settings of the image processing in the master-side projection image generation section 173 based on the adjustment content represented by the content instruction.

The providing section 175 provides the second projector 200 with the composite image information G3a using the master-side communication section 13. Further, the providing section 175 provides the content instruction received when performing the overall adjustment to the second projector 200 using the master-side communication section 13. It should be noted that the providing section 175 does not provide the content instruction received when performing the individual adjustment to the second projector 200.

A3: Configuration Example of Second Projector 200

Figure 5:
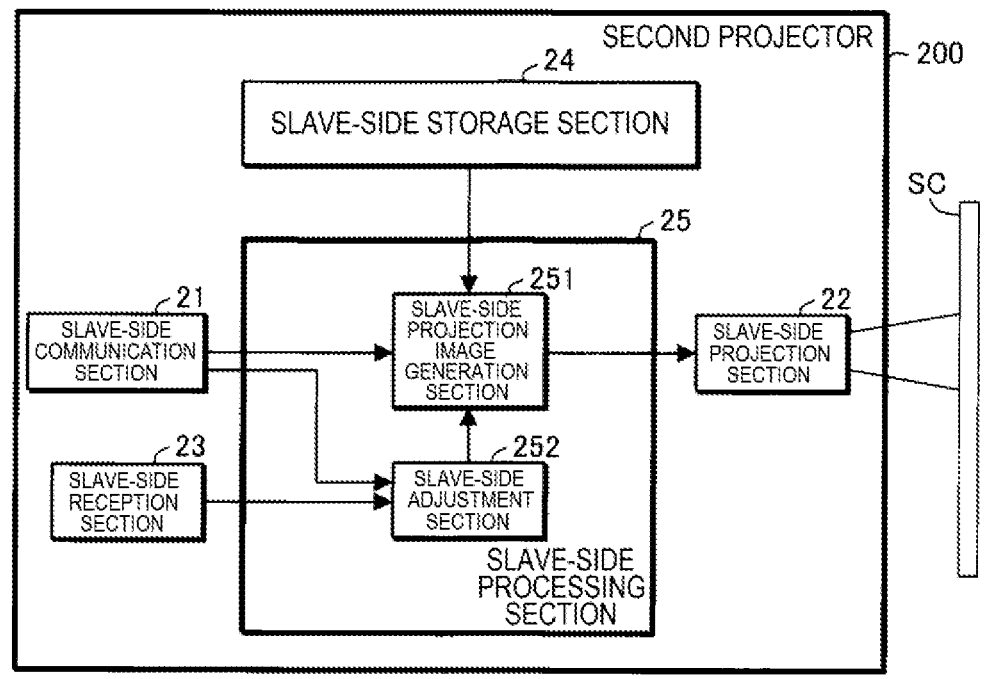
FIG. 5 is a diagram showing an example of a second projector 200.

FIG. 5 is a diagram showing an example of the second projector 200. The second projector 200 includes a slave-side communication section 21, a slave-side projection section 22, a slave-side reception section 23, a slave-side storage section 24, and a slave-side processing section 25.

The slave-side communication section 21 communicates with the first projector 100 and the third projector 300. For example, the slave-side communication section 21 receives the composite image information G3a from the first projector 100. Further, the slave-side communication section 21 transmits the composite image information G3a to the third projector 300.

The slave-side projection section 22 projects the second projection image 200a on the projection surface SC to thereby display the second projection image 200a based on second partial image information representing the second projection image 200a. The second partial image information is generated by the slave-side processing section 25 based on the composite image information G3a, and then, provided to the slave-side projection section 22.

The slave-side reception section 23 is the same in configuration as the master-side reception section 15. Therefore, the detailed description of the slave-side reception section 23 will be omitted.

The slave-side storage section 24 is a computer-readable recording medium. The slave-side storage section 24 is, for example, a flash memory. The slave-side storage section 24 is not limited to the flash memory, but can arbitrarily be changed. The slave-side storage section 24 stores, for example, a variety of types of information and a program to be executed by the slave-side processing section 25.

The slave-side processing section 25 is a computer such as a CPU. The slave-side processing section 25 can also be formed of one processor, or a plurality of processors. The slave-side processing section 25 can also be provided with an electronic circuit such as an FPGA or an ASIC instead of, or in addition to the CPU. The slave-side processing section 25 retrieves and then executes the program stored in the slave-side storage section 24 to thereby realize a slave-side projection image generation section 251 and a slave-side adjustment section 252.

The slave-side projection image generation section 251 generates second partial image information by extracting the second partial image information from the composite image information G3a using second identification information representing a position of the second projection image 200a included in the composite image G3, specifically, a position of the second projection image 200a in the composite image G3. The second identification information is, for example, set by the user, and is stored in the slave-side storage section 24. Further, the slave-side projection image generation section 251 is capable of performing image processing on the second partial image information.

When performing the individual adjustment, the slave-side adjustment section 252 adjusts the settings of the image processing in the slave-side projection image generation section 251 based on the adjustment content represented by the content instruction received by the slave-side reception section 23. Further, when performing the overall adjustment, the slave-side adjustment section 252 adjusts the settings of the image processing in the slave-side projection image generation section 251 based on the adjustment content represented by the content instruction received by the slave-side communication section 21 from the first projector 100.

A4: Configuration Example of Third Projector 300

The third projector 300 is the same in configuration as the second projector 200 except the point that third identification information is used instead of the second identification information. Therefore, the detailed description of the third projector 300 will be omitted. It should be noted that the third identification information represents a position of the third projection image 300a in the composite image G3.

A5: Configuration Example of Fourth Projector 400

The fourth projector 400 is the same in configuration as the second projector 200 except the point that fourth identification information is used instead of the second identification information. Therefore, the detailed description of the fourth projector 400 will be omitted. It should be noted that the fourth identification information represents a position of the fourth projection image 400a in the composite image G3.

A6: Configuration Example of Master-Side Projection Section 14

Figure 6:
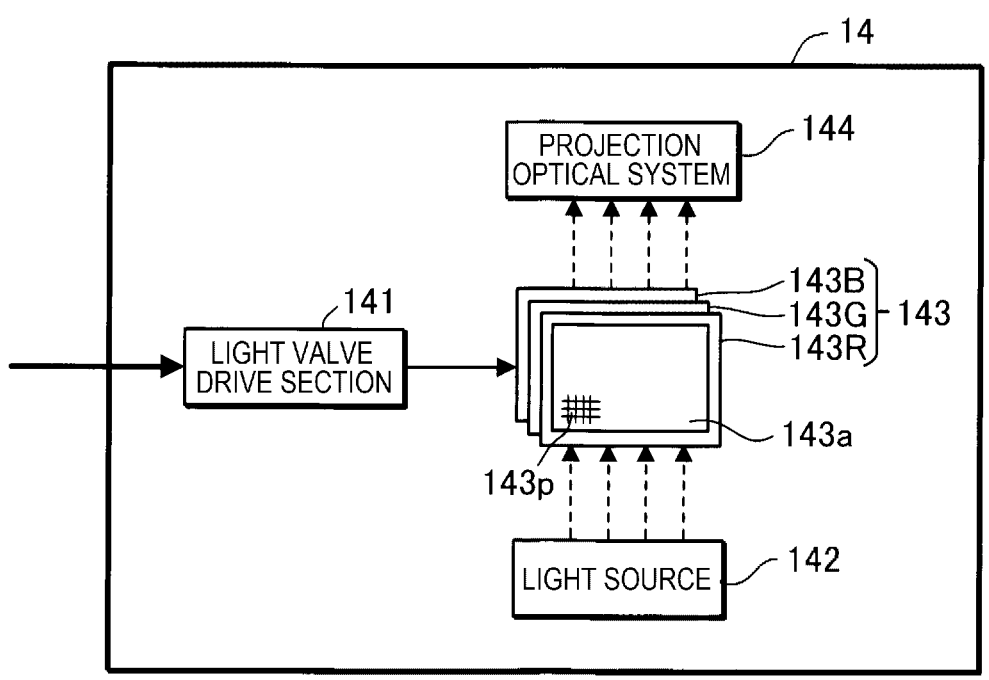
FIG. 6 is a diagram showing an example of a master-side projection section 14.

FIG. 6 is a diagram showing an example of the master-side projection section 14. The master-side projection section 14 includes a light valve drive section 141, a light source 142, a red-color liquid crystal light valve 143R, a green-color liquid crystal light valve 143G, a blue-color liquid crystal light valve 143B, and a projection optical system 144. Hereinafter, when there is no need to distinguish the red-color liquid crystal light valve 143R, the green-color liquid crystal light valve 143G, and the blue-color liquid crystal light valve 143B from each other, these are referred to as "liquid crystal light valves 143."

The light valve drive section 141 drives the liquid crystal light valves 143 based on the first partial image information input from the master-side projection image generation section 173.

The light source 142 is a xenon lamp, a super-high pressure mercury lamp, a light emitting diode (LED), a laser source, or the like. The light emitted from the light source 142 is reduced in variation in the brightness distribution by an integrator optical system not shown, and is then separated by a color separation optical system not shown into colored light components of red, green, and blue as three primary colors of light. The red colored light component enters the red-color liquid crystal light valve 143R. The green colored light component enters the green-color liquid crystal light valve 143G. The blue colored light component enters the blue-color liquid crystal light valve 143B.

The liquid crystal light valves 143 are each formed of a liquid crystal panel having a liquid crystal material existing between a pair of transparent substrates, and so on. The liquid crystal light valves 143 each have a pixel area 143a having a rectangular shape and including a plurality of pixels 143p arranged in a matrix. In each of the liquid crystal light valves 143, a drive voltage is applied to the liquid crystal for each of the pixels 143p. When the light valve drive section 141 applies the drive voltages based on the first partial image information to the respective pixels 143p, each of the pixels 143p is set to the light transmittance based on the drive voltage. Therefore, the light having been emitted from the light source 142 is modulated by passing through the pixel area 143a, and thus, the image based on the first partial image information is formed for each colored light.

The images of the respective colors are synthesized by a color synthesis optical system not shown for each of the pixels 143p, and thus, the first projection image 100a as a color image is generated. The first projection image 100a is projected by the projection optical system 144 on the projection surface SC.

It should be noted that as described above, since the slave-side projection section 22 is the same in configuration as the master-side projection section 14, the detailed description thereof will be omitted.

A7: Projection Operation of First Projector 100

Figure 7:
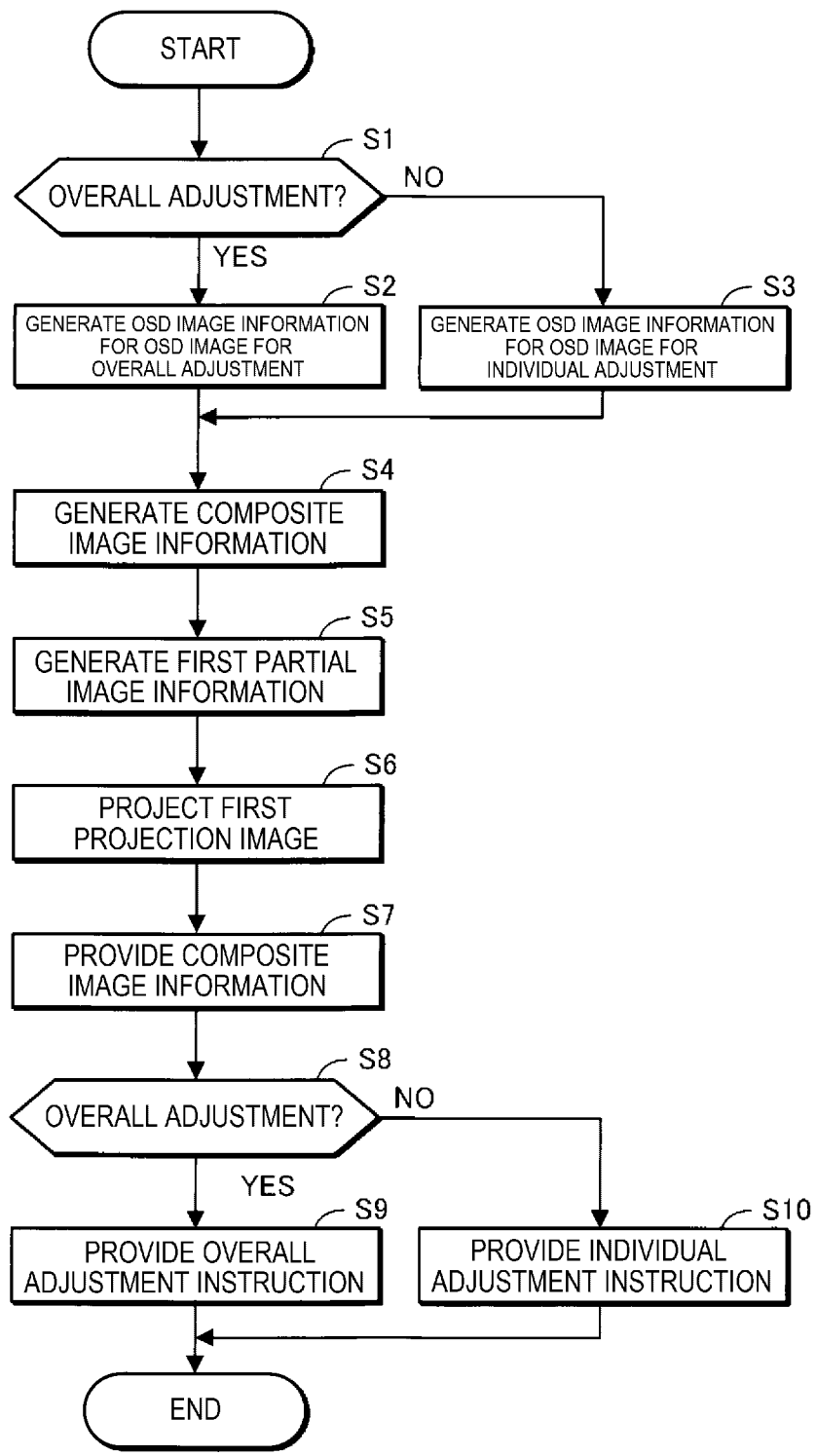
FIG. 7 is a flowchart for explaining an operation of the first projector 100.

FIG. 7 is a flowchart for explaining a projection operation of the first projector 100. Here, it is assumed that the first image information G1a is input to the first projector 100, and the receiving section 12 receives the adjustment instruction.

When the adjustment instruction represents the overall adjustment in the step S1, the OSD image generation section 171 generates the OSD image information G2a representing the OSD image G2 for the overall adjustment in the step S2.

In contrast, when the adjustment instruction represents the individual adjustment in the step S1, the OSD image generation section 171 generates the OSD image information G2a representing the OSD image G2 for the individual adjustment in the step S3.

Figure 8:
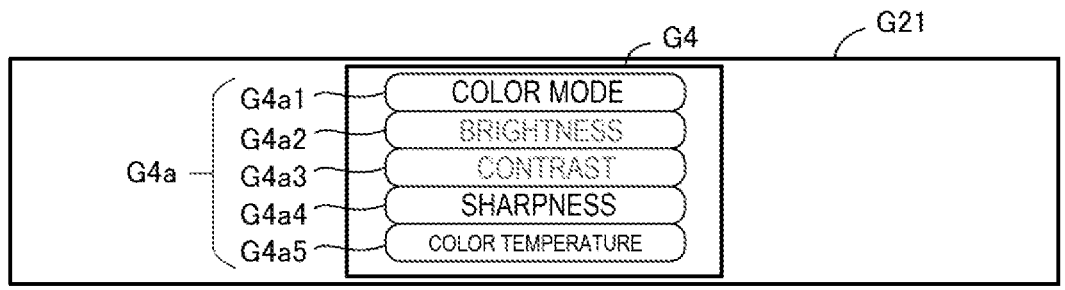
FIG. 8 is a diagram showing an OSD image G21.

FIG. 8 is a diagram showing an OSD image G21 as an example of the OSD image G2 for the overall adjustment. In the OSD image G21 for the overall adjustment shown in FIG. 8, the item selection image G4 is located at a position straddling the second projection image 200a and the third projection image 300a.

Figure 9:
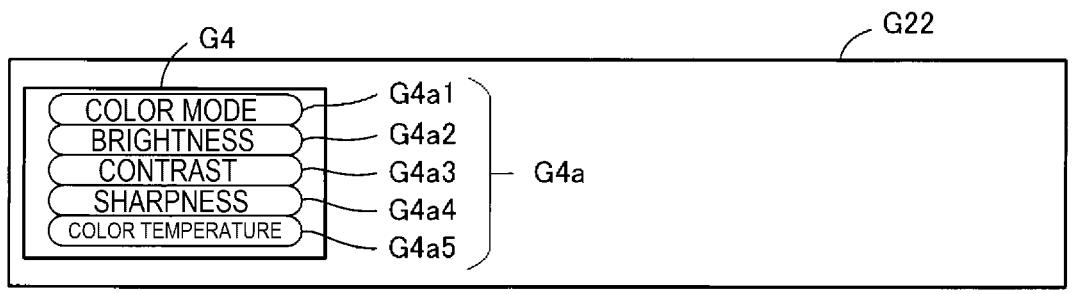
FIG. 9 is a diagram showing an OSD image G22.

FIG. 9 is a diagram showing an OSD image G22 as an example of the OSD image G2 for the individual adjustment. In the OSD image G22 for the individual adjustment shown in FIG. 9, the item selection image G4 is located at a position where the item selection image G4 fits into the first projection image 100a, and is not located in the second projection image 200a, the third projection image 300a, and the fourth projection image 400a.

In the OSD image G21 for the overall adjustment shown in FIG. 8, the items which can be used in the overall adjustment, specifically, the item G4a1 of the color mode, the item G4a4 of the sharpness, and the item G4a5 of the color temperature are represented by the black color, and the items which cannot be used in the overall adjustment, specifically, the item G4a2 of the brightness and the item G4a3 of the contrast are represented by the gray color. In other words, in the OSD image G21 for the overall adjustment, the item G4a2 of the brightness and the item G4a3 of the contrast as the items which cannot be used in the overall adjustment are displayed as grayout. The black color is an example of a first color, and the gray color is an example of a second color different from the first color. The multi-projection system 1 according to the present embodiment makes the display color as the condition of the items G4a included in the OSD image G2 different between the case of the overall adjustment and the case of the individual adjustment.

In the OSD image G22 for the individual adjustment shown in FIG. 9, all of the items displayed in the item selection image G4, specifically, the item G4a1 of the color mode, the item G4a2 of the brightness, the item G4a3 of the contrast, the item G4a4 of the sharpness, and the item G4a5 of the color temperature can be used in the individual adjustment, and are therefore represented by the black color.

Figure 10:
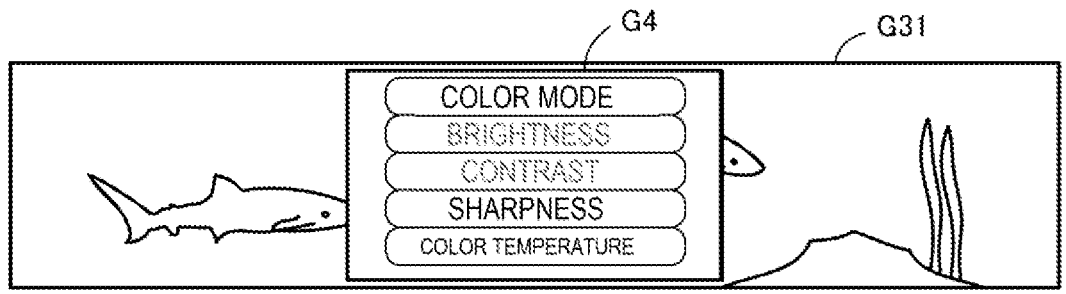
FIG. 10 is a diagram showing an example of a composite image G31.
Figure 11:
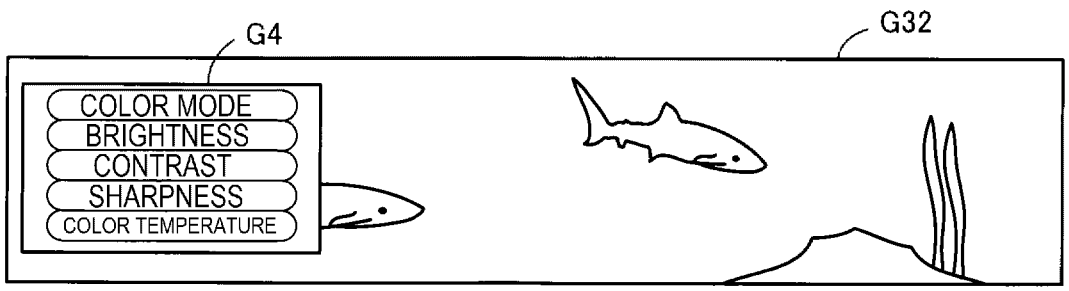
FIG. 11 is a diagram showing an example of a composite image G32.

Going back to FIG. 7, when the OSD image generation section 171 has generated the OSD image information G2a, the composite image generation section 172 generates the composite image information G3a representing the composite image G3 having the OSD image G2 superimposed on the first image G1 in the step S4 using the first image information G1a and the OSD image information G2a. FIG. 10 is a diagram showing an example of a composite image G31 having the OSD image G21 for the overall adjustment superimposed on the first image G1. FIG. 11 is a diagram showing an example of a composite image G32 having the OSD image G22 for the individual adjustment superimposed on the first image G1.

Going back to FIG. 7, the master-side projection image generation section 173 subsequently extracts the first partial image information from the composite image information G3a in the step S5 to thereby generate the first partial image information. The master-side projection image generation section 173 outputs the first partial image information to the master-side projection section 14.

Subsequently, the master-side projection section 14 projects the first projection image 100a on the projection surface SC based on the first partial image information to display the first projection image 100a in the step S6.

Subsequently, in the step S7, the providing section 175 provides the second projector 200 with the composite image information G3a using the master-side communication section 13.

Subsequently, when the overall adjustment is determined in the step S8, the providing section 175 provides the second projector 200 with the overall adjustment instruction for instructing the overall adjustment in the step S9 using the master-side communication section 13. In contrast, when the individual adjustment is determined in the step S8, the providing section 175 provides the second projector 200 with the individual adjustment instruction for instructing the individual adjustment in the step S10 using the master-side communication section 13.

When the slave-side projection image generation section 251 of the second projector 200 has received the overall adjustment instruction via the slave-side communication section 21, the slave-side projection image generation section 251 sets the adjustment mode to the overall adjustment mode, and then the slave-side communication section 21 provides the third projector 300 with the overall adjustment instruction.

Further, when the slave-side projection image generation section 251 of the second projector 200 has received the individual adjustment instruction via the slave-side communication section 21, the slave-side projection image generation section 251 sets the adjustment mode to the individual adjustment mode, and then the slave-side communication section 21 provides the third projector 300 with the individual adjustment instruction.

Also in the third projector 300 and the fourth projector 400, the adjustment mode is set as described below similarly to the second projector 200.

When the third projector 300 has received the overall adjustment instruction from the second projector 200, the third projector 300 sets the adjustment mode to the overall adjustment mode, and at the same time, provides the fourth projector 400 with the overall adjustment instruction. Further, when the third projector 300 has received the individual adjustment instruction from the second projector 200, the third projector 300 sets the adjustment mode to the individual adjustment mode, and at the same time, provides the fourth projector 400 with the individual adjustment instruction.

When the fourth projector 400 has received the overall adjustment instruction from the third projector 300, the fourth projector 400 sets the adjustment mode to the overall adjustment mode, but does not perform the provision of the overall adjustment instruction. Further, when the fourth projector 400 has received the individual adjustment instruction from the third projector 300, the fourth projector 400 sets the adjustment mode to the individual adjustment mode, but does not perform the provision of the individual adjustment instruction.

A8: Projection Operation of Second Projector 200

Figure 12:
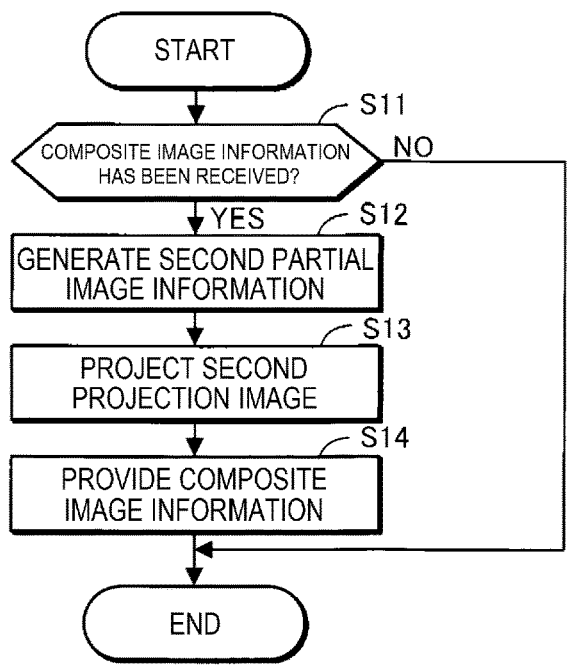
FIG. 12 is a flowchart for explaining an operation of the second projector 200.

FIG. 12 is a flowchart for explaining the operation of the second projector 200 projecting the second projection image 200a.

When the slave-side communication section 21 has received the composite image information G3a from the first projector 100 in the step S11, the slave-side projection image generation section 251 generates the second partial image information from the composite image information G3a in the step S12.

It should be noted that in the case of the individual adjustment mode, it is also possible for the slave-side projection image generation section 251 to generate the image information representing the image in which the item selection image G4 shown in FIG. 9 is superimposed on the second projection image 200a represented by the second partial image information, as the second partial image information on which the image processing has been performed.

Subsequently, the slave-side projection image generation section 251 outputs the second partial image information to the slave-side projection section 22. It should be noted that when the second partial image information on which the image processing has been performed is generated in the individual adjustment mode, the slave-side projection image generation section 251 outputs the second partial image information on which the image processing has been performed to the slave-side projection section 22.

Subsequently, the slave-side projection section 22 projects the second projection image 200a on the projection surface SC based on the second partial image information to display the second projection image 200a in the step S13. It should be noted that when the second partial image information on which the image processing has been performed in the individual adjustment mode, the slave-side projection section 22 projects the image having the item selection image G4 superimposed on the second projection image 200*a* on the projection surface SC based on the second partial image information on which the image processing has been performed to display the image having the item selection image G4 superimposed on the second projection image 200*a*.

Subsequently, in the step S14, the slave-side communication section 21 provides the third projector 300 with the composite image information G3*a*.

A9: Projection Operation of Third Projector 300

The projection operation of the third projection image 300*a* in the third projector 300 is different only in the following point from the projection operation of the second projection image 200*a* in the second projector 200 shown in FIG. 12.

The third projector 300 generates third partial image information representing the third projection image 300*a* instead of the second partial image information in the step S12. It should be noted that in the case of the individual adjustment mode, it is also possible for the third projector 300 to generate the image information representing the image in which the item selection image G4 shown in FIG. 9 is superimposed on the third projection image 300*a*, as the third partial image information on which the image processing has been performed.

In the step S13, the third projector 300 projects the third projection image 300*a* instead of the second projection image 200*a*. It should be noted that when the third projector 300 generates the third partial image information on which the image processing has been performed in the individual adjustment mode, the third projector 300 projects the image having the item selection image G4 superimposed on the third projection image 300*a* on the projection surface SC based on the third partial image information on which the image processing has been performed to display the image having the item selection image G4 superimposed on the third projection image 300*a*.

In the step S14, the third projector 300 provides the composite image information G3*a* to the fourth projector 400 instead of the third projector 300.

A10: Projection Operation of Fourth Projector 400

The projection operation of the fourth projection image 400*a* in the fourth projector 400 is different only in the following point from the projection operation of the second projection image 200*a* in the second projector 200 shown in FIG. 12.

The fourth projector 400 generates fourth partial image information representing the fourth projection image 400*a* instead of the second partial image information in the step S12. It should be noted that in the case of the individual adjustment mode, it is also possible for the fourth projector 400 to generate the image information representing the image in which the item selection image G4 shown in FIG. 9 is superimposed on the fourth projection image 400*a*, as the fourth partial image information on which the image processing has been performed.

In the step S13, the fourth projector 400 projects the fourth projection image 400*a* instead of the second projection image 200*a*. It should be noted that when the fourth projector 400 generates the fourth partial image information on which the image processing has been performed in the individual adjustment mode, the fourth projector 400 projects the image having the item selection image G4 superimposed on the fourth projection image 400*a* on the projection surface SC based on the fourth partial image information on which the image processing has been performed to display the image having the item selection image G4 superimposed on the fourth projection image 400*a*.

The fourth projector 400 does not perform the step S14.

A11: Operation of First Projector 100 when Selecting Items in Overall Adjustment FIG. 13 shows a flowchart for explaining the operation of the first projector 100 when selecting the available items G4*a* represented by the black color in the item selection image G4.

When the receiving section 12 of the first projector 100 has received a selection instruction for selecting any of the items G4*a* represented by the black color in the step S21 in the situation where the item selection image G4 is displayed on the projection surface SC, the OSD image generation section 171 generates adjusting OSD image information G6*a* representing an adjusting OSD image G6 including an adjusting image G5 instead of the OSD image information G2*a* in the step S22. For example, the OSD image generation section 171 generates the adjusting OSD image information G6*a* using the information stored in the master-side storage section 16. The adjusting image G5 is an image for receiving the adjustment content with respect to the item represented by the selection instruction.

Figure 14:
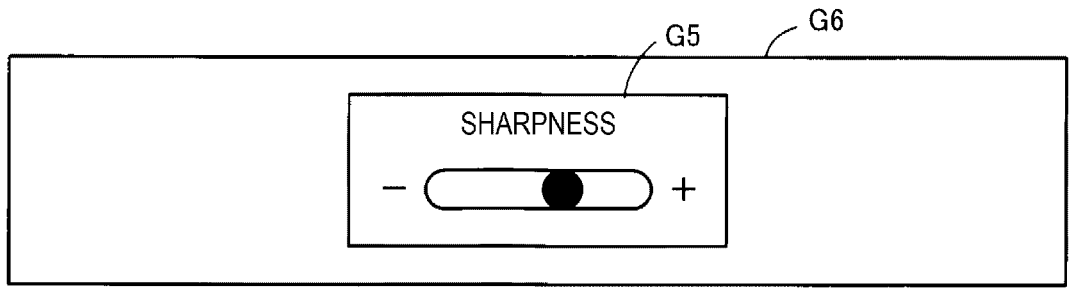
FIG. 14 is a diagram showing an example of an adjusting OSD image G6.

An example of the adjusting OSD image G6 including the adjusting image G5 is shown in FIG. 14. The adjusting image G5 shown in FIG. 14 is an image for adjusting the item G4*a*4 of the sharpness. It should be noted that as the adjusting images for other items than the item G4*a*4 of the sharpness, there are used substantially the same images as the adjusting image G5 shown in FIG. 14. For example, the name of the item selected by the selection instruction is used instead of the item name "sharpness" in the adjusting image G5.

Figure 13:
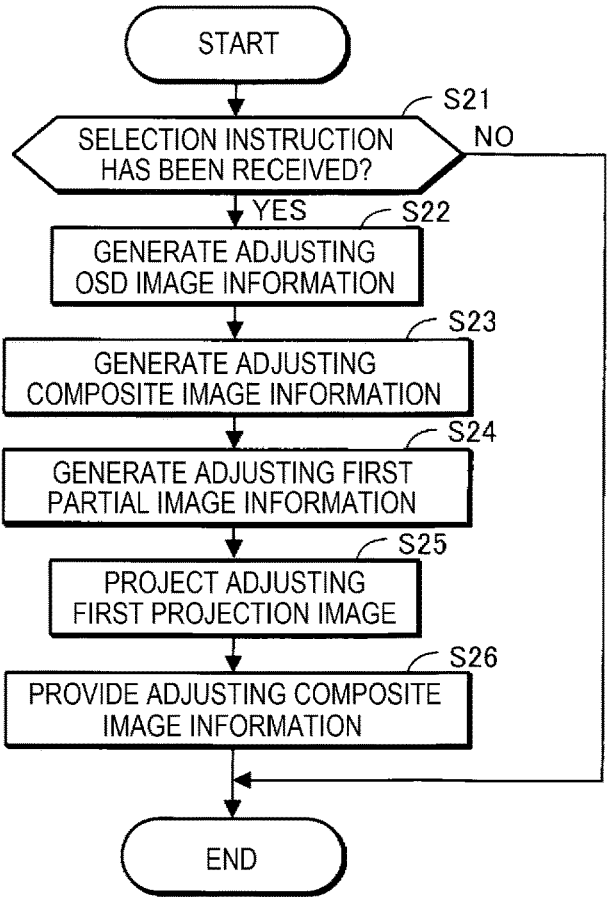
FIG. 13 is a flowchart for explaining an operation of the first projector 100.
Figure 15:
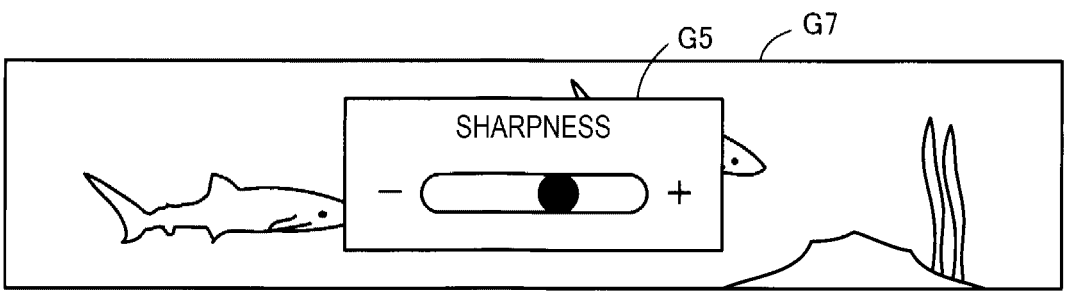
FIG. 15 is a diagram showing an example of an adjusting composite image G7.

Going back to FIG. 13, when the adjusting OSD image information G6*a* has been generated, the composite image generation section 172 generates adjusting composite image information G1*a* representing an adjusting composite image G7 having the adjusting OSD image G6 superimposed on the first image G1 in the step S23 using the first image information G1*a* and the adjusting OSD image information G6*a*. FIG. 15 shows an example of the adjusting composite image G7.

Going back to FIG. 13, the master-side projection image generation section 173 subsequently generates adjusting first partial image information representing an image existing at a position represented by the first identification information out of the adjusting composite image G7 in the step S24 using the adjusting composite image information G7*a*. The master-side projection image generation section 173 outputs the adjusting first partial image information to the master-side projection section 14.

Subsequently, the master-side projection section 14 projects an adjusting first projection image represented by the adjusting first partial image information on the projection surface SC to display the adjusting first projection image in the step S25.

Subsequently, in the step S26, the providing section 175 provides the second projector 200 with the adjusting composite image information G7*a* using the master-side communication section 13.

Figure 16:
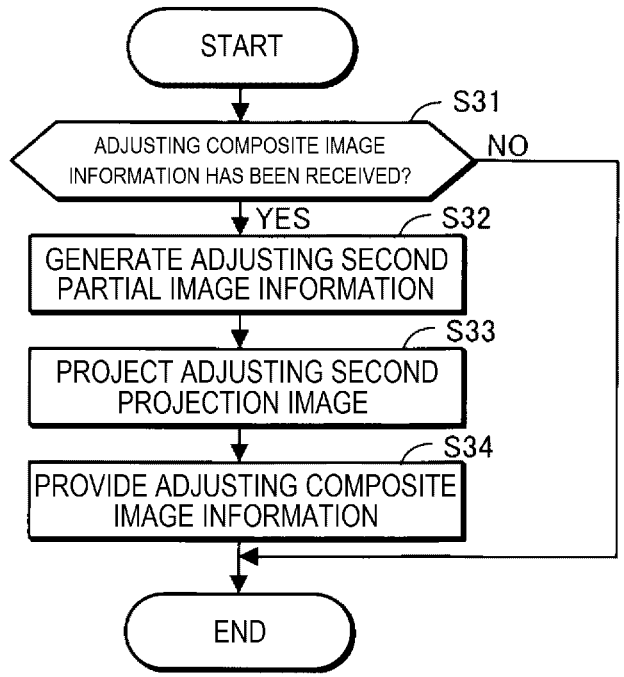
FIG. 16 is a flowchart for explaining an operation of the second projector 200.

A12: Operation of Second Projector 200 when Selecting Items in Overall Adjustment FIG. 16 shows a flowchart for explaining the operation of the second projector 200 when selecting the available items G4*a* in the overall adjustment.

When the slave-side communication section 21 has received the adjusting composite image information G7a from the first projector 100 in the step S31, the slave-side projection image generation section 251 generates adjusting second partial image information representing an image existing at a position represented by the second identification information out of the adjusting composite image G7 using the adjusting composite image information G1a in the step S32. The slave-side projection image generation section 251 outputs the adjusting second partial image information to the slave-side projection section 22.

Subsequently, in the step S33, the slave-side projection section 22 projects an adjusting second projection image represented by the adjusting second partial image information on the projection surface SC to display the adjusting second projection image.

Subsequently, in the step S34, the slave-side communication section 21 provides the third projector 300 with the adjusting composite image information G7a.

A13: Operation of Third Projector 300 when Selecting Items in Overall Adjustment The operation of the third projector 300 when selecting the items in the overall adjustment is different only in the following point from the operation of the second projector 200 shown in FIG. 16.

In the step S32, the third projector 300 generates adjusting third partial image information representing an image existing at a position represented by the third identification information out of the adjusting composite image G7 using the adjusting composite image information G7a. The third projector 300 outputs the adjusting third partial image information to the slave-side projection section 22.

In the step S33, the third projector 300 projects an adjusting third projection image represented by the adjusting third partial image information on the projection surface SC to display the adjusting third projection image instead of the adjusting second projection image. In the step S34, the third projector 300 provides the adjusting composite image information G7a to the fourth projector 400 instead of the third projector 300.

A14: Operation of Fourth Projector 400 when Selecting Items in Overall Adjustment The operation of the fourth projector 400 when selecting the items in the overall adjustment is different only in the following point from the projection operation of the second projection image 200a in the second projector 200 shown in FIG. 16.

In the step S32, the fourth projector 400 generates adjusting fourth partial image information representing an image existing at a position represented by the fourth identification information out of the adjusting composite image G7 using the adjusting composite image information G1a. The fourth projector 400 outputs the adjusting fourth partial image information to the slave-side projection section 22.

In the step S33, the fourth projector 400 projects an adjusting fourth projection image represented by the adjusting fourth partial image information on the projection surface SC to display the adjusting fourth projection image instead of the adjusting second projection image. The fourth projector 400 does not perform the step S34.

A15: Operation of Each Projector when Selecting Items in Individual Adjustment

In the individual adjustment, when the available item is selected, each of the first projector 100, the second projector 200, the third projector 300, and the fourth projector 400 displays the adjusting image G5 corresponding to the item thus selected on the projection surface SC using the OSD.

A16: Setting Adjustment Operation in First Projector 100

Figure 17:
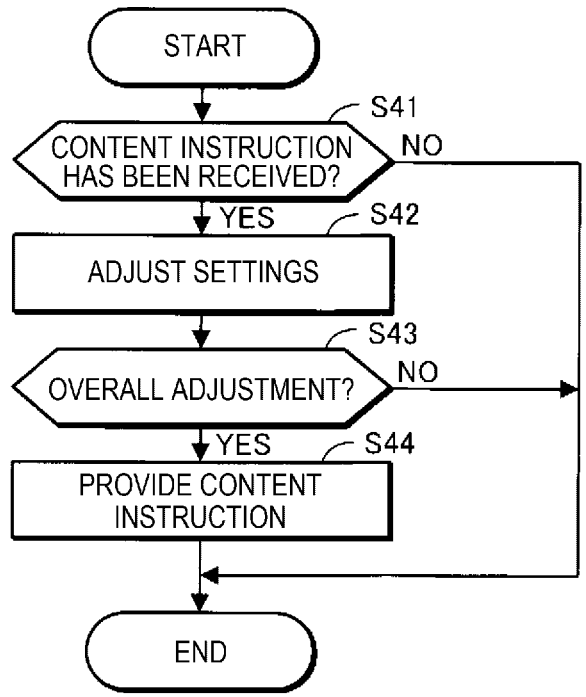
FIG. 17 is a flowchart for explaining an operation of the first projector 100.

FIG. 17 shows a flowchart for explaining the operation when the first projector 100 receives the content instruction representing the adjustment content in a situation where such an adjusting image G5 as illustrated in FIG. 15 is displayed.

When the master-side reception section 15 has received the content instruction in the step S41, the master-side adjustment section 174 adjusts the settings of the first projector 100 based on the adjustment content represented by the content instruction in the step S42.

For example, when the master-side reception section 15 has received the content instruction representing the adjustment content of making the degree of the sharpness of the image to be projected by the first projector 100 higher than in the current state, the master-side adjustment section 174 adjusts the settings of the image processing in the master-side projection image generation section 173 so that the degree of the sharpness of the image to be projected by the first projector 100 becomes higher than in the current state.

Subsequently, when the overall adjustment is determined in the step S43, the providing section 175 provides the second projector 200 with the content instruction in the step S44 using the master-side communication section 13. In contrast, when the individual adjustment is determined in the step S43, the providing section 175 terminates the operation shown in FIG. 17 without providing the content instruction. In other words, the content instruction having been received by the first projector 100 is provided to the second projector 200 only when performing the overall adjustment.

A17: Operation when Second Projector 200 Receives Content Instruction from First Projector 100

Figure 18:
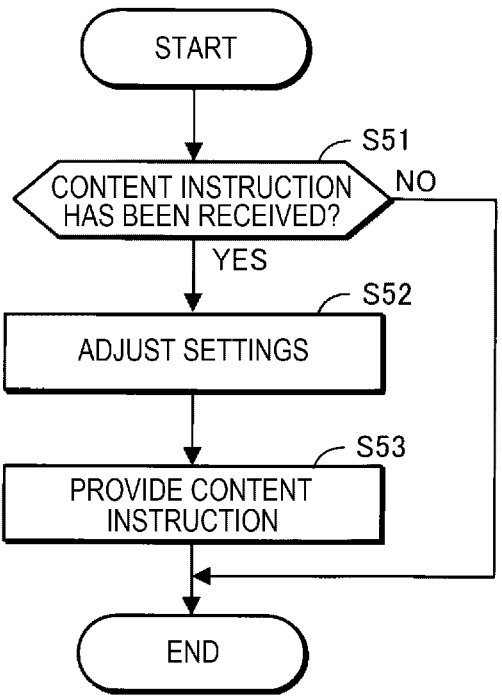
FIG. 18 is a flowchart for explaining an operation of the second projector 200.

FIG. 18 is a flowchart for explaining the operation when the second projector 200 receives the content instruction from the first projector 100.

When the slave-side communication section 21 receives the content instruction from the first projector 100 in the step S51, the slave-side adjustment section 252 adjusts the settings of the image processing in the slave-side projection image generation section 251 based on the adjustment content represented by the content instruction in the step S52. Subsequently, in the step S53, the slave-side communication section 21 provides the third projector 300 with the content instruction.

A18: Operation when Third Projector 300 Receives Content Instruction from Second Projector 200

The operation when the third projector 300 receives the content instruction from the second projector 200 is different only in the following point from the operation when the second projector 200 receives the content instruction.

The third projector 300 adjusts the settings of the image processing in the third projector 300 in the step S52 based on the content instruction provided from the second projector 200, and then provides the content instruction to the fourth projector 400 in the step S53.

A19: Operation when Fourth Projector 400 Receives Content Instruction from Third Projector 300

The operation when the fourth projector 400 receives the content instruction from the third projector 300 is different only in the following point from the operation when the second projector 200 receives the content instruction.

The fourth projector 400 adjusts the settings of the image processing in the fourth projector 400 in the step S52 based on the content instruction provided from the third projector 300, but does not perform the step S53.

A20: Operation when Second Projector 200 Receives Content Instruction from User

Figure 19:
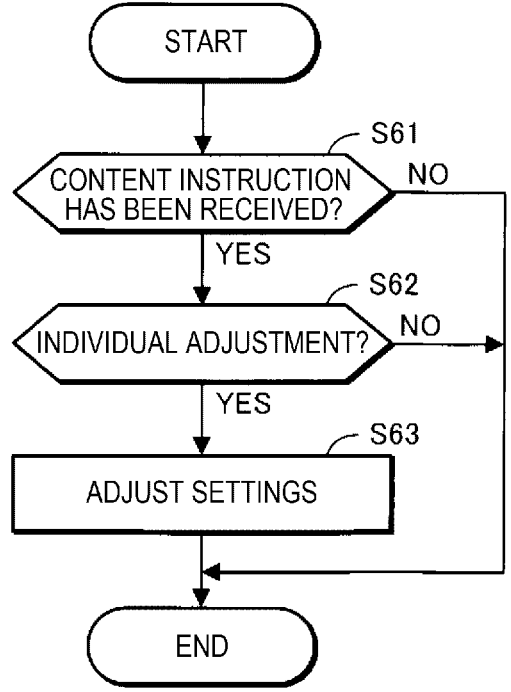
FIG. 19 is a flowchart for explaining an operation of the second projector 200.

FIG. 19 is a flowchart for explaining the operation when the second projector 200 has received the content instruction from the user.

When the slave-side reception section 23 receives the content instruction representing the adjustment content from the user in the step S61, when the adjustment mode is the individual adjustment mode in the step S62, the slave-side adjustment section 252 adjusts the settings of the image processing in the second projector 200 in the step S63 based on the adjustment content represented by the content instruction.

In contrast, when the adjustment mode is the overall adjustment mode in the step S62, the slave-side adjustment section 252 terminates the operation shown in FIG. 19 without performing the adjustment of the settings of the image processing in the second projector 200 based on the adjustment content represented by the content instruction.

It should be noted that the operation when the third projector 300 has received the content instruction from the user, and the operation when the fourth projector 400 has received the content instruction from the user are substantially the same as the operation when the second projector 200 has received the content instruction.

A21: Regarding Overall Adjustment/Individual Adjustment

In the present embodiment, in the overall adjustment mode, it becomes possible to adjust the settings of the first projector 100, the second projector 200, the third projector 300, and the fourth projector 400 based on the adjustment content represented by the content instruction received by the first projector 100. Therefore, it is possible to adjust the settings of a plurality of projectors in a lump. Further, in the present embodiment, in the individual adjustment mode, it is also possible to individually adjust the settings of the first projector 100, the second projector 200, the third projector 300, and the fourth projector 400.

A22: Regarding Adjustment Items

According to the multi-projection system 1, the first projector 100, and the method of controlling the first projector 100 related to the present embodiment, as shown in FIG. 10 and FIG. 11, the condition of the item G4a2 of the brightness and the item G4a3 of the contrast is different in the item selection image G4 between the first case where the adjustment instruction represents the overall adjustment and the second case where the adjustment instruction represents the individual adjustment.

Therefore, it becomes possible for the user to determine whether the item selection image G4 is for the overall adjustment or for the individual adjustment based on the condition of the item G4a2 of the brightness and the item G4a3 of the contrast.

In the present embodiment, the color of the item G4a2 of the brightness and the item G4a3 of the contrast is different in the item selection image G4 between when the adjustment instruction represents the overall adjustment and when the adjustment instruction represents the individual adjustment.

Therefore, it becomes possible for the user to determine whether the item selection image G4 is for the overall adjustment or for the individual adjustment based on the color of the item G4a2 of the brightness and the item G4a3 of the contrast.

Although in the present embodiment, the color of the item G4a2 of the brightness and the item G4a3 of the contrast is set to the gray color when the adjustment instruction represents the overall adjustment, and set to the black color when the adjustment instruction represents the individual adjustment, it is sufficient for the color of the item G4a2 of the brightness and the item G4a3 of the contrast to be different between when the adjustment instruction represents the overall adjustment and when the adjustment instruction represents the individual adjustment.

It should be noted that when the item G4a2 of the brightness and the item G4a3 of the contrast are represented by the gray color when the adjustment instruction represents the overall adjustment, it becomes substantially the same as the situation where grayout is provided to the item G4a2 of the brightness and the item G4a3 of the contrast. Therefore, it becomes easy to make the user recognize the fact that the item G4a2 of the brightness and the item G4a3 of the contrast are not available when the adjustment instruction represents the overall adjustment.

The item G4a2 of the brightness and the item G4a3 of the contrast are items which are unavailable in the overall adjustment, and are available in the individual adjustment. Therefore, it becomes also possible to make the user recognize the fact that the item G4a2 of the brightness and the item G4a3 of the contrast are unavailable in the overall adjustment and are available in the individual adjustment using the difference in condition between the item G4a2 of the brightness and the item G4a3 of the contrast.

Figure 20:
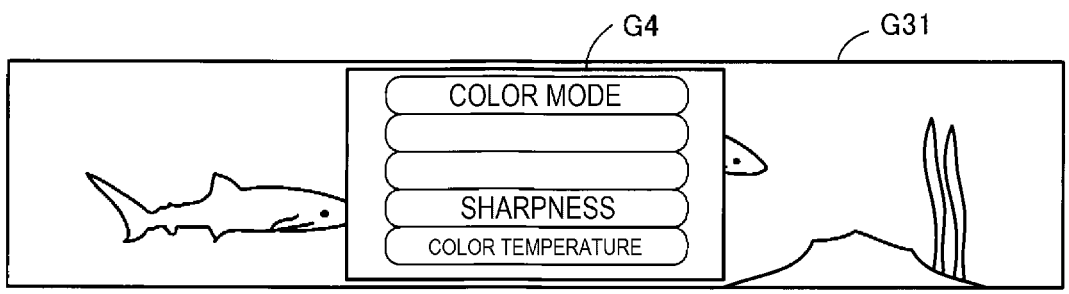
FIG. 20 is a diagram showing another example of an item selection image G4.

It is also possible for the OSD image generation section 171 to exclude the item G4a2 of the brightness and the item G4a3 of the contrast from the item selection image G4 as illustrated in, for example, FIG. 20 when the adjustment instruction represents the overall adjustment, and include the item G4a2 of the brightness and the item G4a3 of the contrast in the item selection image G4 as illustrated in FIG. 11 when the adjustment instruction represents the individual adjustment.

In this case, the item G4a2 of the brightness and the item G4a3 of the contrast become not to be displayed in the item selection image G4 when the item G4a2 of the brightness and the item G4a3 of the contrast are unavailable. Therefore, it is possible to prevent the user from mistakenly recognizing that the item G4a2 of the brightness and the item G4a3 of the contrast are available in the situation where the item G4a2 of the brightness and the item G4a3 of the contrast are unavailable.

It is also possible for the OSD image generation section 171 to make the shapes of the item G4a2 of the brightness and the item G4a3 of the contrast different in the item selection image G4 between when the adjustment instruction represents the overall adjustment and when the adjustment instruction represents the individual adjustment. It is also possible for the multi-projection system 1 according to the present embodiment to make the shapes as the condition of the items G4a included in the OSD image G2 different between the overall adjustment and the individual adjustment.

Figure 21:
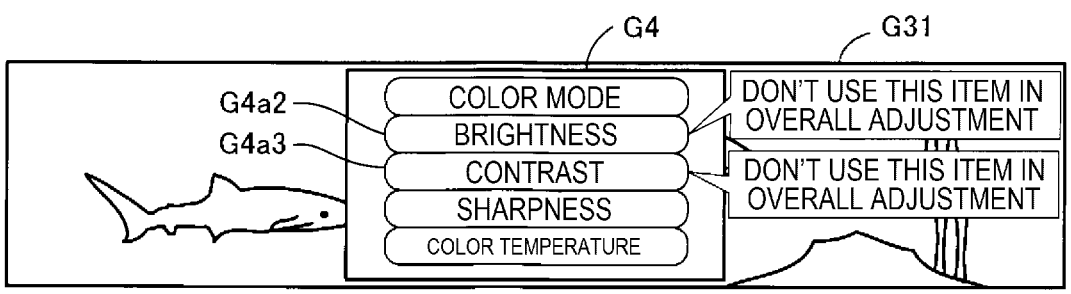
FIG. 21 is a diagram showing another example of the item selection image G4.

For example, it is also possible to include the item G4a2 of the brightness and the item G4a3 of the contrast in the item selection image G4 with the shape of the items alone as illustrated in FIG. 11 when the adjustment instruction represents the individual adjustment, and provide a different shape from the shape illustrated in FIG. 11 to the item G4a2 of the brightness and the item G4a3 of the contrast as illustrated in, for example, FIG. 21 when the adjustment instruction represents the overall adjustment. In FIG. 21, each of the item G4a2 of the brightness and the item G4a3 of the contrast is provided with the shape attached with a pop-up of "DON'T USE THIS ITEM IN OVERALL ADJUSTMENT."

It should be noted that the content of the pop-up is not limited to the content shown in FIG. 21, but can arbitrarily be changed. More specifically, in the item G4a2 of the brightness and the item G4a3 of the contrast, the different shape from the shape illustrated in FIG. 11 is not limited to the shape shown in FIG. 21, but can arbitrarily be changed. Further, the shape of the items alone is not limited to the shape illustrated in FIG. 11, but can arbitrarily be changed.

Figure 22:
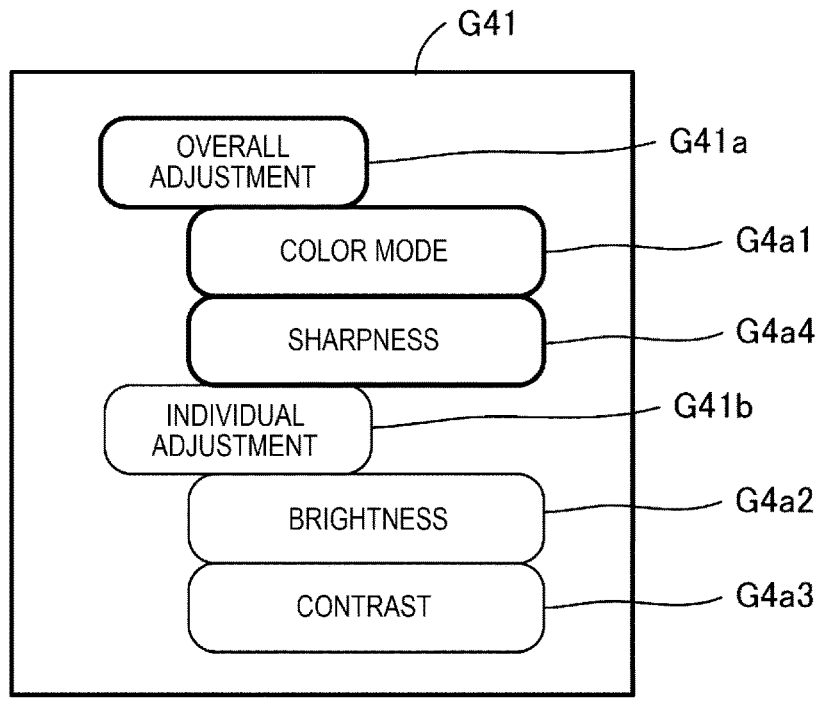
FIG. 22 is a diagram showing another example of the item selection image G4.

Further, it is also possible for the OSD image generation section 171 to use an image G41 which is illustrated in FIG. 22 and hierarchically shows the items available in the overall adjustment and the items available in the individual adjustment, as the item selection image G4.

In the example shown in FIG. 22, the item G4a1 of the color mode and the item G4a4 of the sharpness are located in a lower tier of an item G41a of the overall adjustment, and the item G4a2 of the brightness and the item G4a3 of the contrast are located in a lower tier of an item G41b of the individual adjustment.

Here, it is assumed that in the example shown in FIG. 22, the item G4a1 of the color mode and the item G4a4 of the sharpness are available in the overall adjustment but are unavailable in the individual adjustment, and further, the item G4a2 of the brightness and the item G4a3 of the contrast are unavailable in the overall adjustment but are available in the individual adjustment.

For example, when the adjustment instruction represents the overall adjustment, the OSD image generation section 171 includes the item G41a of the overall adjustment, and the item G4a1 of the color mode and the item G4a4 of the sharpness which are available in the overall adjustment in the image G41 with the black color, and includes the item G41b of the individual adjustment, and the item G4a2 of the brightness and the item G4a3 of the contrast which are unavailable in the overall adjustment with the gray color. It should be noted that when the adjustment instruction represents the overall adjustment, the OSD image generation section 171 is not required to include the item G41b of the individual adjustment, and the item G4a2 of the brightness and the item G4a3 of the contrast which are unavailable in the overall adjustment in the image G41.

In contrast, when the adjustment instruction represents the individual adjustment, the OSD image generation section 171 includes the item G41b of the individual adjustment, and the item G4a2 of the brightness and the item G4a3 of the contrast which are available in the individual adjustment in the image G41 with the black color, and includes the item G41a of the overall adjustment, and the item G4a1 of the color mode and the item G4a4 of the sharpness which are unavailable in the individual adjustment with the gray color. It should be noted that when the adjustment instruction represents the individual adjustment, the OSD image generation section 171 is not required to include the item G41a of the overall adjustment, and the item G4a1 of the color mode and the item G4a4 of the sharpness which are unavailable in the individual adjustment in the image G41.

Figure 23:
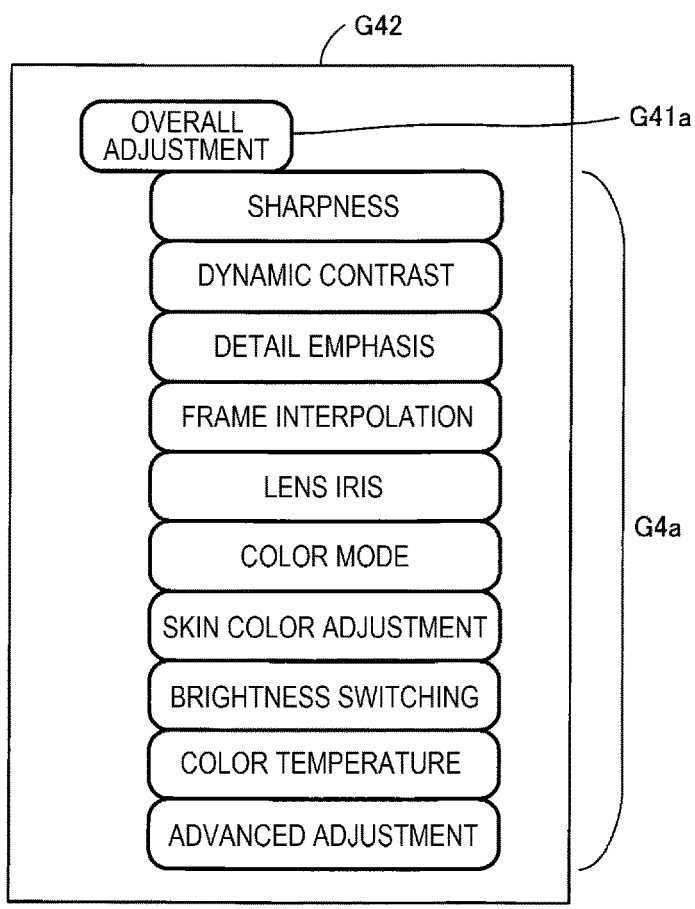
FIG. 23 is a diagram showing another example of the item selection image G4.

When the adjustment instruction represents the overall adjustment, it is also possible for the OSD image generation section 171 to use an image G42 which is illustrated in FIG. 23, and in which the items available in the overall adjustment are located in a lower tier of the item G41a of the overall adjustment, as the item selection image G4.

Figure 24:
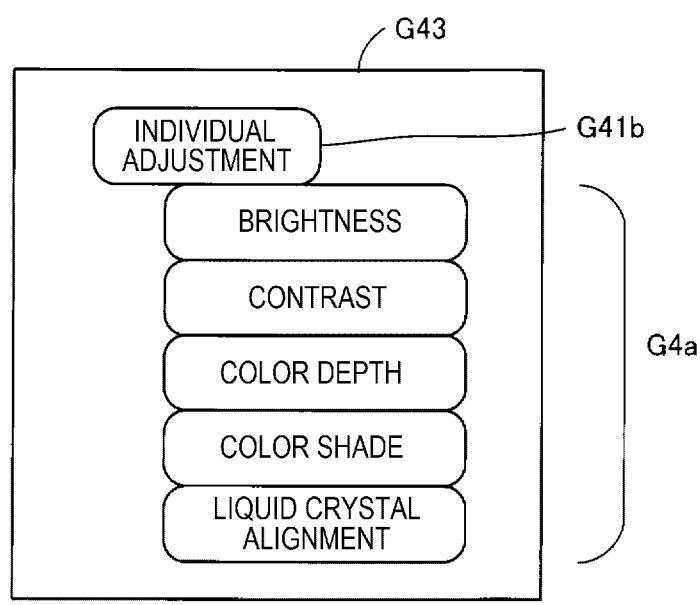
FIG. 24 is a diagram showing another example of the item selection image G4.

Further, when the adjustment instruction represents the individual adjustment, it is also possible for the OSD image generation section 171 to use an image G43 which is illustrated in FIG. 24, and in which the items available in the individual adjustment are located in a lower tier of the item G41b of the individual adjustment, as the item selection image G4.

When the display is switched between the item G41a of the overall adjustment and the item G41b of the individual adjustment in the item selection image G4 in accordance with the adjustment instruction as described above, it becomes possible for the user to easily determine whether the item selection image G4 is for the overall adjustment or for the individual adjustment.

B: MODIFIED EXAMPLES

The configurations in the illustrations described hereinabove can variously be modified. Specific modified aspects will hereinafter be illustrated. Tow or more aspects arbitrarily selected from the following illustrations can arbitrarily be combined unless conflicting with each other.

Modified Example 1

The position and the size of the item selection image G4 in the composite image G3 in the overall adjustment are not limited to the position and the size shown in FIG. 10, FIG. 20, or FIG. 21, but can arbitrarily be changed.

Modified Example 2

When the second identification information is stored in the first projector 100, it is also possible for the providing section 175 to provide the second projector 200 with the second identification information. The second projector 200 generates the second partial image information using the second identification information and the composite image information provided from the first projector 100.

In this case, it is possible for the first projector 100 to designate the second projection image 200a to be projected by the second projector 200 using the second identification information and the composite image information.

Further, it is possible for the second projector 200 to identify an image part the second projector 200 is in charge of out of the first image G1, and an image part the second projector 200 is in charge of out of the OSD image G2 using the single piece of information, namely the second identification information, and it is possible to reduce the information for identifying the image parts compared to the configuration of identifying the image parts with separate pieces of information.

Modified Example 3

The resolution of the OSD image G2 can also be different from the resolution of the first image G1.

Modified Example 4

In the master-side projection section 14 and the slave-side projection section 22, the liquid crystal light valves are used as the light modulation device, but the light modulation device is not limited to the liquid crystal light valves, and can arbitrarily be changed. For example, it is also possible for the light modulation device to have a configuration using three reflective liquid crystal panels. Further, it is also possible for the light modulation device to have a configuration such as a system using a single liquid crystal panel, a system using three digital mirror devices (DMD), or a system using a single digital mirror device. When just one liquid crystal panel or DMD is used as the light modulation device, the members corresponding to the color separation optical system and the color synthesis optical system are unnecessary. Further, besides the liquid crystal panel or the DMD, any configurations capable of modulating the light emitted by the light source can be adopted as the light modulation device.

What is claimed is:

1. A multi-projection system including a plurality of projectors and configured to combine projection images of the plurality of projectors with each other to thereby display an image including an item selection image used to select an item to be adjusted from a plurality of adjustment items on a projection surface, the multi-projection system comprising:
    a first projector as one of the plurality of projectors including
    a processor or circuit programmed to:
    receive an instruction related to an adjustment of the multi-projection system;
    make a condition of the adjustment item in the item selection image different between a first case where the instruction represents a first adjustment of adjusting the plurality of projectors in a lump and a second case where the instruction represents a second adjustment of individually adjusting the plurality of projectors wherein the adjustment items include a first item which is unavailable in the first adjustment and is available in the second adjustment or wherein the adjustment items include a second item which is unavailable in the second adjustment and is available in the first adjustment; and
    exclude one of the adjustment items from the item selection image in the first case, and include the one of the adjustment items in the item selection image in the second case, or exclude one of the adjustment items from the item selection image in the second case, and include the one of the adjustment items in the item selection image in the first case.

2. The multi-projection system according to claim 1, wherein
    the item selection image is superimposed on a first image.

3. The multi-projection system according to claim 1, wherein the processor or circuit is further programmed to:
    make a color of the adjustment item different between the first case and the second case.

4. The multi-projection system according to claim 1, wherein the processor or circuit is further programmed to:
    make a shape of the adjustment item different between the first case and the second case.

5. The multi-projection system according to claim 1, wherein the processor or circuit is further programmed to:
    receive the content instruction representing the adjustment content with respect to the adjustment item selected in the item selection image, the first projector further comprising:
    adjust settings of the first projector based on the adjustment content represented by the content instruction; and
    provide a second projector included in the plurality of projectors and different from the first projector with the content instruction in the first case.

6. The multi-projection system according to claim 5, wherein the processor or circuit is further programmed to:
    fail to provide the second projector with the content instruction in the second case.

7. A projector belonging to a multi-projection system configured to combine projection images of a plurality of projectors with each other to thereby display an image including an item selection image used to select an item to be adjusted from a plurality of adjustment items on a projection surface, the projector comprising:
    a processor or circuit programmed to:
    receive an instruction related to an adjustment of the multi-projection system in a situation where the projector belongs to the multi-projection system;
    make a condition of the adjustment item in the item selection image different between a first case where the instruction represents a first adjustment of adjusting the plurality of projectors in a lump and a second case where the instruction represents a second adjustment of individually adjusting the plurality of projectors wherein the adjustment items include a first item which is unavailable in the first adjustment and is available in the second adjustment or wherein the adjustment items include a second item which is unavailable in the second adjustment and is available in the first adjustment; and
    exclude one of the adjustment items from the item selection image in the first case, and include the one of the adjustment items in the item selection image in the second case, or exclude one of the adjustment items from the item selection image in the second case, and include the one of the adjustment items in the item selection image in the first case.

8. A method of controlling a projector belonging to a multi-projection system configured to combine projection images of a plurality of projectors with each other to thereby display an image including an item selection image used to select an item to be adjusted from a plurality of adjustment items on a projection surface, the method comprising:
    receiving an instruction related to an adjustment of the multi-projection system in a situation where the projector belongs to the multi-projection system;
    making a condition of the adjustment item in the item selection image different between a first case where the instruction represents a first adjustment of adjusting the plurality of projectors in a lump and a second case where the instruction represents a second adjustment of individually adjusting the plurality of projectors wherein the adjustment items include a first item which is unavailable in the first adjustment and is available in the second adjustment or wherein the adjustment items include a second item which is unavailable in the second adjustment and is available in the first adjustment; and
    excluding one of the adjustment items from the item selection image in the first case, and including the one of the adjustment items in the item selection image in the second case, or excluding one of the adjustment items from the item selection image in the second case, and including the one of the adjustment items in the item selection image in the first case.

9. The method of controlling the projector according to claim 8, wherein
    the item selection image is superimposed on a first image.

10. The method of controlling the projector according to claim 8,
    a color of the adjustment item is made different between the first case and the second case.

11. The method of controlling the projector according to claim 8, wherein a shape of the adjustment item is made different between the first case and the second case.

12. A method of controlling a first projector belonging to a multi-projection system configured to combine projection images of a plurality of projectors with each other to thereby display an image including an item selection image used to select an item to be adjusted from a plurality of adjustment items on a projection surface, the method comprising:
- receiving an instruction related to an adjustment of the multi-projection system in a situation where the first projector belongs to the multi-projection system; and
- making a condition of the adjustment item in the item selection image different between a first case where the instruction represents a first adjustment of adjusting the plurality of projectors in a lump and a second case where the instruction represents a second adjustment of individually adjusting the plurality of projectors;
- receiving content instruction representing an adjustment content with respect to the adjustment item selected in the item selection image;
- adjusting settings of the first projector based on the adjustment content represented by the content instruction and
- providing, by the first projector, a second projector included in the multi-projection system and different from the first projector with the content instruction in the first case.

* * * * *